United States Patent
Okabe et al.

(10) Patent No.: US 11,371,365 B2
(45) Date of Patent: Jun. 28, 2022

(54) COMPOSITE BLADE AND METHOD FOR MANUFACTURING COMPOSITE BLADE

(71) Applicant: MITSUBISHI HEAVY INDUSTRIES, LTD., Tokyo (JP)

(72) Inventors: Ryoji Okabe, Tokyo (JP); Kentaro Shindo, Tokyo (JP); Masami Kamiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 238 days.

(21) Appl. No.: 16/611,404

(22) PCT Filed: May 2, 2018

(86) PCT No.: PCT/JP2018/017534
§ 371 (c)(1),
(2) Date: Nov. 6, 2019

(87) PCT Pub. No.: WO2018/207702
PCT Pub. Date: Nov. 15, 2018

(65) Prior Publication Data
US 2020/0173292 A1 Jun. 4, 2020

(30) Foreign Application Priority Data
May 8, 2017 (JP) .............................. JP2017-092364

(51) Int. Cl.
*F01D 5/28* (2006.01)
*F01D 5/14* (2006.01)
(Continued)

(52) U.S. Cl.
CPC .............. *F01D 5/282* (2013.01); *B29C 70/30* (2013.01); *B32B 1/00* (2013.01); *B32B 3/02* (2013.01);
(Continued)

(58) Field of Classification Search
CPC . F01D 5/282; F01D 5/147; B32B 1/00; B32B 3/263; B32B 2603/00; B32B 2260/021; B32B 2260/023; B29L 2031/08
See application file for complete search history.

(56) References Cited

U.S. PATENT DOCUMENTS

| | | | |
|---|---|---|---|
| 4,268,571 A | 5/1981 | McCarthy | |
| 4,810,167 A * | 3/1989 | Spoltman | B32B 5/26 416/229 A |

(Continued)

FOREIGN PATENT DOCUMENTS

| | | |
|---|---|---|
| JP | 6-500157 | 1/1994 |
| JP | 2016-032929 | 3/2016 |

OTHER PUBLICATIONS

Written Opinion of the International Searching Authority dated Nov. 15, 2018 in International (PCT) Patent Application No. PCT/JP2018/017534.

(Continued)

*Primary Examiner* — Joanna Pleszczynska
(74) *Attorney, Agent, or Firm* — Wenderoth, Lind & Ponack, L.L.P.

(57) ABSTRACT

A composite blade is formed by laying up composite layers in which reinforced fibers are impregnated with resin. The composite layers are laid up in a blade thickness direction that is a direction connecting a suction side and a pressure side of the composite blade. The composite blade includes a thick part that has a surface layer area from a surface of the thick part to a predetermined depth in the blade thickness direction and a deep layer area at a depth larger than the predetermined depth from the surface in the blade thickness direction. A median value in a predetermined range of thicknesses of each composite layer in the surface layer area (Continued)

is smaller than a median value in a predetermined range of thicknesses of each composite layer in the deep layer area.

3 Claims, 4 Drawing Sheets

(51) Int. Cl.
- *B32B 1/00* (2006.01)
- *B32B 3/02* (2006.01)
- *B32B 3/26* (2006.01)
- *B29C 70/30* (2006.01)
- *B32B 5/24* (2006.01)
- *B32B 27/06* (2006.01)
- *B32B 27/12* (2006.01)
- *B29L 31/08* (2006.01)

(52) U.S. Cl.
CPC .............. *B32B 3/263* (2013.01); *B32B 5/245* (2013.01); *B32B 27/065* (2013.01); *B32B 27/12* (2013.01); *B29L 2031/08* (2013.01); *B32B 2603/00* (2013.01); *F05D 2300/603* (2013.01)

(56) References Cited

U.S. PATENT DOCUMENTS

| | | |
|---|---|---|
| 5,096,384 A | 3/1992 | Immell et al. |
| 5,375,978 A | 12/1994 | Evans et al. |
| 2011/0054850 A1* | 3/2011 | Roach .................... B29C 70/54 703/1 |
| 2016/0250812 A1 | 9/2016 | Roach et al. |

OTHER PUBLICATIONS

International Search Report dated Jul. 31, 2018 in International (PCT) Patent Application No. PCT/JP2018/017534.

* cited by examiner

COMPOSITE BLADE AND METHOD FOR MANUFACTURING COMPOSITE BLADE

FIELD

The present invention relates to a composite blade and a method for manufacturing a composite blade.

BACKGROUND

For a turbine blade and a turbine vane, a composite blade formed by laying up composite layers in which reinforced fibers are impregnated with resin is used. A composite blade used for an industrial gas turbine compressor has high-order torsion in order to achieve a high bypass ratio, and the thickness in a blade thickness direction changes greatly. To increase aerodynamic performance, the composite blade needs to secure the accuracy of the profile of a suction-side surface, a pressure-side surface, a leading edge-side surface, and a trailing edge-side surface and the accuracy of thickness thereof. For such a composite blade, a laid-up structure obtained by combining long and short composite layers has been proposed in order to avoid shear peeling at a part where a shape change is large (see Patent Literature 1).

CITATION LIST

Patent Literature

Patent Literature 1: U.S. Pat. No. 5,375,978

SUMMARY

Technical Problem

In a composite blade disclosed in Patent Literature 1, a massive amount of thin composite layers are coupled to secure the accuracy of the profile and the thickness. In the composite blade disclosed in Patent Literature 1, the number of laid-up composite layers is changed depending on places to respond to a change in thickness in a blade thickness direction. However, a step of preparing thin composite layers with high accuracy, a step of coupling a massive amount of thin composite layers with high accuracy, and a method for changing the number of laid-up composite layers depending on places with high accuracy are all difficult, and hence the method disclosed in Patent Literature 1 has a problem in that the accuracy of the profile and the thickness of the composite blade cannot be sufficiently secured. Because these steps are all difficult, the method disclosed in Patent Literature 1 has a problem in that the manufacturing yield of the composite blade decreases and as a result, the manufacturing cost of the composite blade increases.

The present invention has been made in view of the above, and it is an object thereof to provide a composite blade and a method for manufacturing a composite blade capable of sufficiently securing the accuracy of the profile and the thickness and reducing manufacturing cost.

Solution to Problem

To solve the problem described above and achieve the object, a composite blade is formed by laying up composite layers in which reinforced fibers are impregnated with resin. The composite layers are laid up in a blade thickness direction that is a direction connecting a suction side and a pressure side of the composite blade. The composite blade includes a thick part that has a surface layer area from a surface of the thick part to a predetermined depth in the blade thickness direction and a deep layer area at a depth larger than the predetermined depth from the surface in the blade thickness direction. A median value of thicknesses of each composite layer in the surface layer area is smaller than a median value of thicknesses of each composite layer in the deep layer area.

Further, to solve the problem described above and achieve the object, a composite blade is formed by laying up composite layers in which reinforced fibers are impregnated with resin. The composite layers are laid up in a blade thickness direction that is a direction connecting a suction side and a pressure side of the composite blade. The composite blade includes a thick part that has a surface layer area from a surface of the thick part to a predetermined depth in the blade thickness direction and a deep layer area at a depth larger than the predetermined depth from the surface in the blade thickness direction. An average value of thicknesses of each composite layer in the surface layer area is smaller than an average value of thicknesses of each composite layer in the deep layer area.

With these configurations, relatively thin composite layers are used in the surface layer area, and relatively thick composite layers are used in the deep layer area. Consequently, the accuracy of profile can be sufficiently secured by the relatively thin composite layers, and the manufacturing cost can be reduced by the relatively thick composite layers, and as a whole, the accuracy of thickness can be sufficiently secured.

In these configurations, it is preferable that, in a plane direction including a blade width direction that is a direction connecting a leading edge side and a trailing edge side of the composite blade and a blade length direction that is a direction connecting a blade tip side and a blade root side of the composite blade, an area of the composite layers in the surface layer area is larger than an area of the composite layers in the deep layer area. With this configuration, in the surface layer area in which the relatively thin composite layers are used, the accuracy of profile in a wider range in the plane direction including the blade width direction and the blade length direction can be secured.

In these configurations, it is preferable that a thin part that is thinner than the thick part and is devoid of the deep layer area is included. With this configuration, in the surface layer area in which the relatively thin composite layers are used, the accuracy of thickness in a part where the thickness in the blade thickness direction is small can be secured.

In these configurations, it is preferable that a blade part on the suction side and a blade part on the pressure side is included, the blade part on the suction side and the blade part on the pressure side are bonded at a neutral surface, the blade part on the suction side has, in the blade thickness direction, a suction-side surface layer area from a surface on the suction side to the predetermined depth and a suction-side deep layer area at a depth larger than the predetermined depth from the surface on the suction side in the blade thickness direction, and the blade part on the pressure side has, in the blade thickness direction, a pressure-side surface layer area from a surface on the pressure side to the predetermined depth and a pressure-side deep layer area at a depth larger than the predetermined depth from the surface on the pressure side in the blade thickness direction. With this configuration, on the suction side and the pressure side, the accuracy of profile can be sufficiently secured by the relatively thin composite layers, and the manufacturing cost can be reduced by the relatively thick composite layers, and as a whole, the accuracy of thickness can be sufficiently secured.

In these configurations, it is preferable that an end part of the composite blade in a blade width direction that is a direction connecting a leading edge side and a trailing edge side of the composite blade is composed of the suction-side surface layer area and the pressure-side surface layer area, and end parts of the composite layers in the blade width direction in the suction-side surface layer area and end parts of the composite layers in the blade width direction in the pressure-side surface layer area are alternatingly provided in contact with neutral surface-side surfaces of composite layers in the other surface layer area. With this configuration, ply drops, which are gaps formed near the neutral surface when composite layers are laid up, can be divided and made small by the end parts of the composite layers in the blade width direction. Consequently, the strength and the reliability at the end parts in the blade width direction can be improved.

Further, to solve the problem described above and achieve the object, a composite blade is formed by laying up composite layers in which reinforced fibers are impregnated with resin. The composite layers are laid up in a blade thickness direction that is a direction connecting a suction side and a pressure side of the composite blade. The composite blade has a suction-side surface layer area from a surface on the suction side to a predetermined depth in the blade thickness direction, a suction-side deep layer area at a depth larger than the predetermined depth from the surface on the suction side in the blade thickness direction, a pressure-side surface layer area from a surface on the pressure side to a predetermined depth in the blade thickness direction, and a pressure-side deep layer area at a depth larger than the predetermined depth from the surface on the pressure side in the blade thickness direction. The suction-side surface layer area and the suction-side deep layer area, and the pressure-side surface layer area and the pressure-side deep layer area are bonded at a neutral surface. An end part of the composite blade in a blade width direction that is a direction connecting a leading edge side and a trailing edge side of the composite blade is composed of the suction-side surface layer area and the pressure-side surface layer area. End parts of composite layers in the blade width direction in the suction-side surface layer area and end parts of composite layers in the blade width direction in the pressure-side surface layer area are alternatingly provided in contact with neutral surface-side surfaces of composite layers in the other surface layer area.

With this configuration, ply-drops, which are gaps formed near the neutral surface when composite layers are laid up, can be divided and reduced by the end parts of the composite layers. Consequently, the strength and the reliability at the end parts in the blade width direction can be improved. Thus, the shape is stabilized, and the accuracy of the profile and the thickness can be sufficiently secured. The composite layers do not need to be coupled symmetrically about the neutral surface in the blade thickness direction, and hence the manufacturing cost can be reduced.

To solve the problem described above and achieve the object, a method is for manufacturing a composite blade by laying up composite layers in which reinforced fibers are impregnated with resin. The method includes a suction-side surface layer area laying-up step of laying up, on a suction-side mold having a suction-side forming surface for forming a suction-side surface of the composite blade, composite layers such that a suction-side surface layer area is formed from the suction-side surface to a predetermined depth in a blade thickness direction that is a direction connecting a suction side and a pressure side of the composite blade; a suction-side deep layer area laying-up step of laying up, on the composite layers laid up on the suction-side mold in which the suction-side surface layer area is formed, composite layers such that a suction-side deep layer area is formed at a depth larger than the predetermined depth from the suction-side surface in the blade thickness direction; a pressure-side surface layer area laying-up step of laying up, on a pressure-side mold having a pressure-side forming surface for forming a pressure-side surface of the composite blade, composite layers such that a pressure-side surface layer area is formed from the pressure-side surface to a predetermined depth in the blade thickness direction; a pressure-side deep layer area laying-up step of laying up, on the composite layers laid up on the pressure-side mold in which the pressure-side surface layer area is formed, composite layers such that a pressure-side deep layer area is formed at a depth larger than the predetermined depth from the pressure-side surface in the blade thickness direction; and a bonding step of coupling and bonding, at a neutral surface, the composite layers laid up on the suction-side mold in which the suction-side surface layer area and the suction-side deep layer area are formed and the composite layers laid up on the pressure-side mold in which the pressure-side surface layer area and the pressure-side deep layer area are formed. A median value of thicknesses of each composite layer in the suction-side surface layer area is smaller than a median value of thicknesses of each composite layer in the suction-side deep layer area. A median value of thicknesses of each composite layer in the pressure-side surface layer area is smaller than a median value of thicknesses of each composite layer in the pressure-side deep layer area.

Further, to solve the problem described above and achieve the object, a method is for manufacturing a composite blade by laying up composite layers in which reinforced fibers are impregnated with resin. The method includes a suction-side surface layer area laying-up step of laying up, on a suction-side mold having a suction-side forming surface for forming a suction-side surface of the composite blade, composite layers such that a suction-side surface layer area is formed from the suction-side surface to a predetermined depth in a blade thickness direction that is a direction connecting a suction side and a pressure side of the composite blade; a suction-side deep layer area laying-up step of laying up, on the composite layers laid up on the suction-side mold in which the suction-side surface layer area is formed, composite layers such that a suction-side deep layer area is formed at a depth larger than the predetermined depth from the suction-side surface in the blade thickness direction; a pressure-side surface layer area laying-up step of laying up, on a pressure-side mold having a pressure-side forming surface for forming a pressure-side surface of the composite blade, composite layers such that a pressure-side surface layer area is formed from the pressure-side surface to a predetermined depth in the blade thickness direction; a pressure-side deep layer area laying-up step of laying up, on the composite layers laid up on the pressure-side mold in which the pressure-side surface layer area is formed, composite layers such that a pressure-side deep layer area is formed at a depth larger than the predetermined depth from the pressure-side surface in the blade thickness direction; and a bonding step of coupling and bonding, at a neutral surface, the composite layers laid up on the suction-side mold in which the suction-side surface layer area and the suction-side deep layer area are formed and the composite layers laid up on the pressure-side mold in which the pressure-side surface layer area and the pressure-side deep layer area are formed. An average value of thicknesses of each composite layer in the suction-side surface layer area is smaller than an average value of thicknesses of each composite layer in the suction-side deep layer area. An average value of thicknesses of each composite layer in the pressure-side surface layer area is smaller than an average value of thicknesses of each composite layer in the pressure-side deep layer area.

With these configurations, on the suction side and the pressure side, relatively thin composite layers are used in the surface layer area, and relatively thick composite layers are used in the deep layer area. Consequently, the accuracy of profile can be sufficiently secured by the relatively thin composite layers, and the manufacturing cost can be reduced by the relatively thick composite layers, and as a whole, the accuracy of thickness can be sufficiently secured.

Advantageous Effects of Invention

According to the present invention, the composite blade and the method for manufacturing a composite blade capable of sufficiently securing the accuracy of the profile and the thickness and reducing manufacturing cost can be provided.

DESCRIPTION OF EMBODIMENTS

Embodiments of the present invention are described in detail below with reference to the drawings. The present invention is not limited by the embodiments. Components in the embodiments include the ones that can be easily replaced by a person skilled in the art and the ones that are substantially the same. The components described below can be combined as appropriate.

First Embodiment

Figure 1:
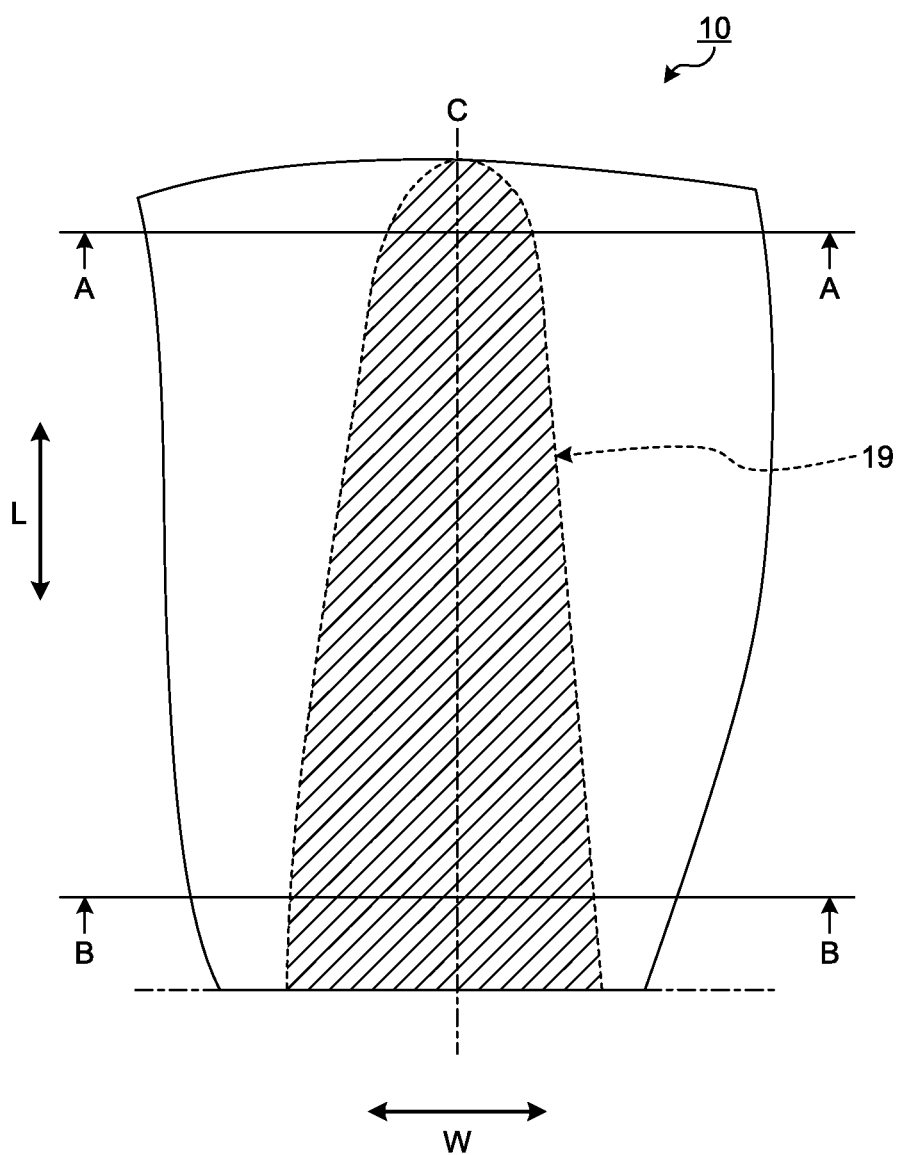
FIG. 1 is a schematic plan view of a composite blade according to a first embodiment.

FIG. 1 is a schematic plan view of a composite blade 10 according to a first embodiment. The composite blade 10 includes composite material. Specifically, the composite blade 10 is formed by laying up composite layers in a blade thickness direction that is a direction connecting a suction side and a pressure side of the composite blade 10. As illustrated in FIG. 1, the composite blade 10 has an internal region 19 inside. The internal region 19 is a region in which, for example, material different from the composite material, specifically, foamed material is used in order to reduce the weight of the composite blade 10. The composite blade 10 is not limited to the configuration having the internal region 19, and may have a configuration without the internal region 19. A direction L illustrated in FIG. 1 is a blade length direction that is a direction connecting a blade tip side and a blade root side of the composite blade 10. A direction W illustrated in FIG. 1 is a blade width direction that is a direction connecting a leading edge side and a trailing edge side of the composite blade 10.

The composite material included in the composite blade 10 has reinforced fibers and resin impregnated in the reinforced fibers. Examples of the composite material include material used for an aircraft, an automobile, and a ship. Examples of the reinforced fibers include the ones obtained by bundling several hundreds to several thousands of elementary fibers of 5 μm or more and 7 μm or less. Preferred examples of the elementary fibers constituting the reinforced fibers include glass fibers, carbon fibers, and aramid fibers. The elementary fibers constituting the reinforced fibers are not limited thereto, and may be other plastic fibers or metal fibers. The illustration of the reinforced fibers is omitted in FIG. 1 to FIG. 4 and FIG. 7. In practice, thin reinforced fibers are arranged inside the composite blade 10 side by side.

The resin impregnated in the reinforced fibers is preferably thermosetting resin, but may be thermoplastic resin. Examples of the thermosetting resin include epoxy resin, polyester resin, and vinylester resin. Examples of the thermoplastic resin include polyamide resin, polypropylene resin, acrylonitrile butadiene styrene (ABS) resin, polyetheretherketone (PEEK), polyetherketoneketone (PEKK), and polyphenylene sulfide (PPS). However, the resin impregnated in the reinforced fibers is not limited thereto, and may be other types of resin.

When the resin impregnated in the reinforced fiber is thermosetting resin, the thermosetting resin can become a softened state, a cured state, and a semi-cured state. The softened state is a state before the thermosetting resin is thermally cured. The softened state is a state without self-standability, in which the shape cannot be kept when not supported by a support. The softened state is a state in which the thermosetting resin can undergo thermosetting reaction when heated. The cured state is a state after the thermosetting resin is thermally cured. The cured state is a state with self-standability, in which the shape can be kept even when not supported by a support. The cured state is a state in which the thermosetting resin cannot undergo thermosetting reaction even when heated. The semi-cured state is a state between the softened state and the cured state. The semi-cured state is a state in which the thermosetting resin is thermally cured to the degree lower than in the cured state. The semi-cured state is a state with self-standability, in which the shape can be kept even when not supported by a support. The semi-cured state is a state in which the thermosetting resin can undergo thermosetting reaction when heated. It is preferred that composite layers forming the composite blade 10 be prepreg in which thermosetting resin is in the semi-cured state.

As composite layers forming the composite blade 10, composite layers in which the orientation angles of reinforced fibers, that is, angles of the arrangement direction of reinforced fibers with respect to the blade length direction, are different are laid up. The orientation angle of reinforced fibers is defined such that the blade length direction is 0 degrees and the clockwise direction is a + direction. Specifically, the composite layers forming the composite blade 10 whose orientation angles of reinforced fibers are 0 degrees, 90 degrees, +45 degrees, and −45 degrees are laid up with appropriate ratios. The composite layers forming the composite blade 10 have different elastic moduli in respective directions depending on the orientation angle of reinforced fiber, and a composite layer whose orientation angle of reinforced fibers is 0 degrees has the highest elastic modulus.

The composite blade 10 is preferentially reinforced in the blade length direction, that is, the orientation ratio in the 0-degree direction is increased, so that tolerance to high centrifugal force can be improved. The thickness of the composite blade 10 can be reduced to reduce the weight. On the other hand, when the length of the composite blade 10 is increased and the thickness thereof is reduced, the natural frequency of bending vibration decreases. Thus, in the case where the length of the composite blade 10 is increased and the thickness thereof is reduced in order to increase the air volume and reduce the weight, the decrease in natural frequency of bending vibration can be suppressed by increasing the number of laid up composite layers whose orientation angle of reinforced fibers is 0 degrees, which have high bending rigidity. In other words, by increasing the number of laid-up composite layers whose orientation angle of reinforced fibers is 0 degrees, which have high bending rigidity, the increase in length and the reduction in weight of the composite blade 10 can be achieved together with the suppression in decrease in natural frequency of bending vibration.

Figure 2:
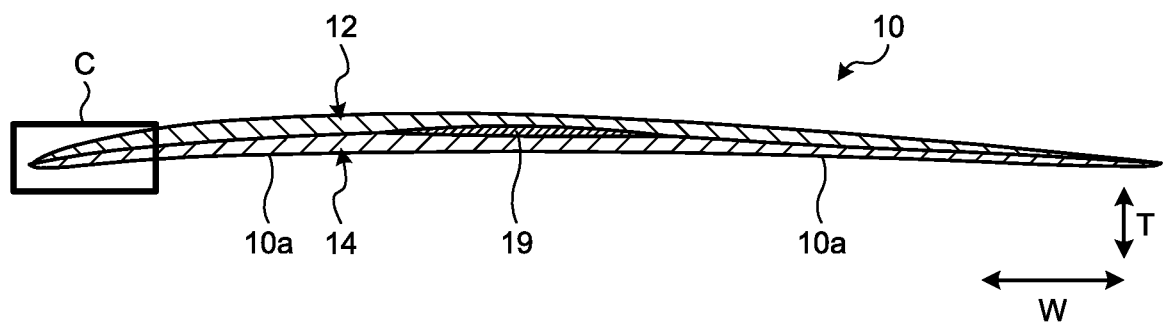
FIG. 2 is a schematic cross-sectional view of the composite blade in a cross-section including a thin part according to the first embodiment.
Figure 3:
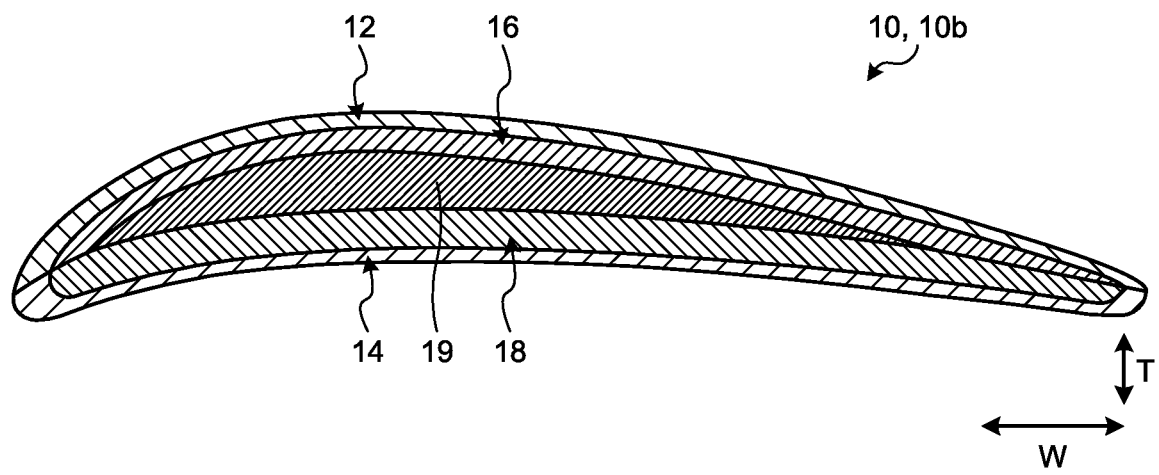
FIG. 3 is a schematic cross-sectional view of the composite blade in a cross-section including a thick part according to the first embodiment.

FIG. 2 is a schematic cross-sectional view of the composite blade 10 in a cross-section including a thin part 10a according to the first embodiment. FIG. 2 is a cross-sectional view taken along line A-A in FIG. 1. FIG. 3 is a schematic cross-sectional view of the composite blade 10 in a cross-section including a thick part 10b according to the first embodiment. FIG. 3 is a cross-sectional view taken along line B-B in FIG. 1. The direction T illustrated in FIG. 2 and FIG. 3 is the blade thickness direction of the composite blade 10. As illustrated in FIG. 2 and FIG. 3, the thin part 10a is thinner than the thick part 10b in the blade thickness direction.

As illustrated in FIG. 2, the composite blade 10 includes the thin part 10a. The thin part 10a has a suction-side surface layer area 12 and a pressure-side surface layer area 14. The suction-side surface layer area 12 is a region from the surface on the suction side to a predetermined depth in the blade thickness direction. The pressure-side surface layer area 14 is a region from the surface on the pressure side to a predetermined depth in the blade thickness direction. The suction-side surface layer area 12 and the pressure-side surface layer area 14 are each included in a surface layer area from the surface to a predetermined depth in the blade thickness direction. The thin part 10a does not include deep layer areas described below, that is, a suction-side deep layer area 16 and a pressure-side deep layer area 18.

As illustrated in FIG. 3, the composite blade 10 includes the thick part 10b. The thick part 10b has the suction-side surface layer area 12, the pressure-side surface layer area 14, the suction-side deep layer area 16, the pressure-side deep layer area 18, and the internal region 19. The suction-side deep layer area 16 is a region at a depth larger than the predetermined depth from the surface on the suction side in the blade thickness direction. The pressure-side deep layer area 18 is a region from the surface on the pressure side to a depth smaller than the predetermined depth in the blade thickness direction. The suction-side deep layer area 16 and the pressure-side deep layer area 18 are each included in a surface layer area at a depth larger than the predetermined depth from the surface to in the blade thickness direction.

As illustrated in FIG. 2 and FIG. 3, the composite blade 10 has the suction-side surface layer area 12, the pressure-side surface layer area 14, the suction-side deep layer area 16, the pressure-side deep layer area 18, and the internal region 19. The suction-side surface layer area 12 and the suction-side deep layer area 16 are each a region located on the suction side with respect to the middle in the blade thickness direction, and are included in a blade part on the suction side. The pressure-side surface layer area 14 and the pressure-side deep layer area 18 are each a region located on the pressure side with respect to the middle in the blade thickness direction, and are included in a blade part on the pressure side. In other words, the composite blade 10 has the blade part on the suction side and the blade part on the pressure side. In the composite blade 10, the blade part on the suction side and the blade part on the pressure side are bonded at a neutral surface. Specifically, in the composite blade 10, the suction-side deep layer area 16 at the blade part on the suction side and the pressure-side deep layer area 18 at the blade part on the pressure side are bonded at the neutral surface.

In the composite blade 10, in a plane direction including the blade width direction and the blade length direction, the area of the suction-side surface layer area 12 and the pressure-side surface layer area 14 as surface layer areas is larger than that of the suction-side deep layer area 16 and the pressure-side deep layer area 18 as deep layer areas. Specifically, in the composite blade 10, in the plane direction including the blade width direction and the blade length direction, the area of composite layers in the suction-side surface layer area 12 and the pressure-side surface layer area 14 as surface layer areas is larger than that of composite layers in the suction-side deep layer area 16 and the pressure-side deep layer area 18 as deep layer areas.

Figure 4:
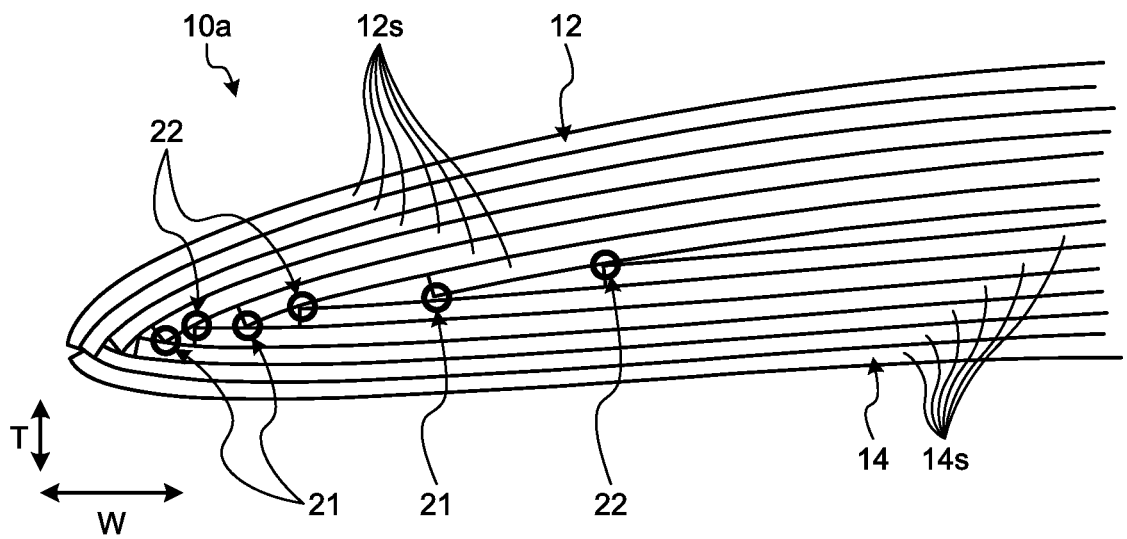
FIG. 4 is an enlarged cross-sectional view of an end part of the composite blade according to the first embodiment.

FIG. 4 is an enlarged cross-sectional view of an end part of the composite blade 10 according to the first embodiment. FIG. 4 is an enlarged view of a region C in FIG. 2. As illustrated in FIG. 4, in a cross-section cut along a place orthogonal to the blade length direction, end parts of the composite blade 10 in the blade width direction, that is, a leading edge-side end part and a trailing edge-side end part of the composite blade 10 are composed of the suction-side surface layer area 12 and the pressure-side surface layer area 14 as surface layer areas. At the end parts of the composite blade 10 in the blade width direction, end parts of a plurality of composite layers 12s in the suction-side surface layer area 12 and end parts of a plurality of composite layers 14s in the pressure-side surface layer area 14 are alternatingly provided in contact with a neutral surface-side surface of a composite layer in the other surface layer area. Specifically, at the end parts of the composite blade 10 in the blade width direction, a contact part 21 in which an end part of the composite layer 12s is in contact with the surface of the composite layer 14s and a contact part 22 in which an end part of the composite layer 14s is in contact with the surface of the composite layer 12s are alternatingly arranged.

In the composite blade 10, the contact parts 21 and the contact parts 22 are alternatingly arranged at the end parts in the blade width direction, and hence as compared with the case where the end part of the composite layer 12s is in contact with the end part of the composite layer 14s, ply-drops, which are gaps formed near the neutral surface when the composite layers are laid up, can be divided and made small by the end parts of the composite layers. Consequently, the strength and the reliability of the composite blade 10 are improved at the end parts in the blade width direction. Thus, in the composite blade 10, the shape is stabilized, and the accuracy of the profile and the thickness can be sufficiently secured. In the composite blade 10, the composite layers do not need to be coupled symmetrically about the neutral surface in the blade thickness direction, and hence manufacturing cost can be reduced.

Figure 5:
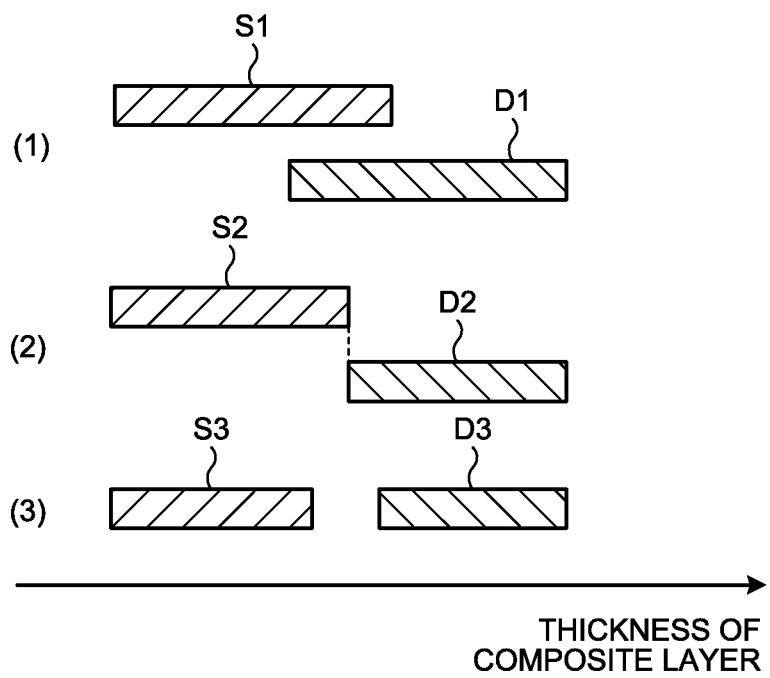
FIG. 5 is an explanatory diagram for describing ranges of thicknesses of composite layers constituting the composite blade according to the first embodiment.

FIG. 5 is an explanatory diagram for describing the ranges of the thicknesses of the composite layers constituting the composite blade 10 according to the first embodiment. In Pattern 1 of the ranges of the thicknesses of the composite layers constituting the composite blade 10, as illustrated in field (1) in FIG. 5, the composite blade 10 has a range S1 of the thickness of each composite layer in the suction-side surface layer area 12 and the pressure-side surface layer area 14 as surface layer areas, and a range D1 of the thickness of each composite layer in the suction-side deep layer area 16 and the pressure-side deep layer area 18 as deep layer areas. A median value of the range S1, that is, a median value of thicknesses of each composite layer in the surface layer areas is smaller than a median value of the range D1, that is, a median value of thicknesses of each composite layer in the deep layer area. An average value of the range S1, that is, an average value of thicknesses of each composite layer in the surface layer areas is smaller than an average value of the range D1, that is, an average value of thicknesses of each composite layer in the deep layer areas. Thus, in Pattern 1, the thickness of each composite layer in the surface layer areas tends to be smaller than the thickness of each composite layer in the deep layer areas. In Pattern 1, the range S1 and the range D1 couple one another. Thus, in Pattern 1, the tendency is replaced at a part between the thickness of each composite layer in the surface layer areas and the thickness of each composite layer in the deep layer areas. For example, in Pattern 1, the thickest layer among composite layers in the surface layer areas is thicker than the thinnest layer among composite layers in the deep layer areas.

In Pattern 2 of the ranges of the thicknesses of the composite layers constituting the composite blade 10, as illustrated in field (2) in FIG. 5, the composite blade 10 has a range S2 of the thickness of each composite layer in the suction-side surface layer area 12 and the pressure-side surface layer area 14 as surface layer areas, and a range D2 of the thickness of each composite layer in the suction-side deep layer area 16 and the pressure-side deep layer area 18 as deep layer areas. A median value of the range S2, that is, a median value of thicknesses of each composite layer in the surface layer areas is smaller than a median value of the range D2, that is, a median value of thicknesses of each composite layer in the deep layer areas. An average value of the range S2, that is, an average value of thicknesses of each composite layer in the surface layer areas is smaller than an average value of the range D2, that is, an average value of thicknesses of each composite layer in the deep layer areas. Thus, in Pattern 2, the thickness of each composite layer in the surface layer areas tends to be smaller than the thickness of each composite layer in the deep layer area. In Pattern 2, the range S2 and the range D2 couple one another only at a particular thickness. Thus, in Pattern 2, the thickest layer among composite layers in the surface layer areas has the same thickness as the thinnest layer among composite layers in the deep layer area.

In Pattern 3 of the ranges of the thicknesses of the composite layers constituting the composite blade 10, as illustrated in field (3) in FIG. 5, the composite blade 10 has a range S3 of the thickness of each composite layer in the suction-side surface layer area 12 and the pressure-side surface layer area 14 as surface layer areas, and a range D3 of the thickness of each composite layer in the suction-side deep layer area 16 and the pressure-side deep layer area 18 as deep layer areas. A median value of the range S3, that is, a median value of thicknesses of each composite layer in the surface layer areas is smaller than a median value of the range D3, that is, a median value of thicknesses of each composite layer in the deep layer areas. An average value of the range S3, that is, an average value of thicknesses of each composite layer in the surface layer areas is smaller than an average value of the range D3, that is, an average value of thicknesses of each composite layer in the deep layer areas. Thus, in Pattern 3, the thickness of each composite layer in the surface layer areas tends to be smaller than the thickness of each composite layer in the deep layer areas. In Pattern 3, there is a given thickness gap between the range S3 and the range D3. Thus, in Pattern 3, even the thickest layer among composite layers in the surface layer areas is thinner than the thinnest layer among composite layers in the deep layer areas.

In the composite blade 10, in any of the above-mentioned patterns, the tendency of the thickness of each composite layer in the surface layer areas is not monotonous. Specifically, in the composite blade 10, a composite layer becomes thicker in the blade thickness direction in some parts in the surface layer areas, and a composite layer becomes thinner in other parts. In the composite blade 10, in any of the above-mentioned patterns, the tendency of the thickness of each composite layer in the deep layer areas is not monotonous. Specifically, in the composite blade 10, a composite layer becomes thicker in the blade thickness direction in some parts in the deep layer areas, and a composite layer becomes thinner in other parts.

The accuracy of profile of the composite blade becomes higher as the thickness of each of laid-up composite layers becomes smaller, but the number of laid-up composite layers increases, and manufacturing cost increases. In the composite blade, on the other hand, the number of laid-up composite layers can be reduced as the thickness of each of laid-up composite layers becomes larger, and the manufacturing cost can be reduced, but the accuracy of profile decreases. Thus, as described above, a small constraint condition that the thickness of each composite layer in the surface layer areas tends to be smaller than the thickness of each composite layer in the deep layer area is imposed, so that the composite blade 10 can sufficiently secure the profile and reduce the manufacturing cost at the same time without hardly decreasing the degree of freedom of design. The composite blade 10 can sufficiently secure the accuracy of thickness as a whole.

In the composite layers in the suction-side surface layer area 12 and the pressure-side surface layer area 14 as surface layer areas, it is preferred that reinforced fibers be spread woven fabric in which a fiber bundle constituting reinforced fibers is made spread to be wide. In this case, in the composite layers in the suction-side surface layer area 12 and the pressure-side surface layer area 14 as surface layer areas, the fiber bundle constituting reinforced fibers can be made thin, and hence the profile can be secured with higher accuracy.

In the composite blade 10, the suction-side blade part is divided into two regions, that is, the suction-side surface layer area 12 and the suction-side deep layer area 16. Composite layers each having a relatively small thickness are laid up in the suction-side surface layer area 12, and composite layers each having a relatively large thickness are laid up in the suction-side deep layer area 16. It is preferred that, at a center part of the composite blade 10 on the blade root side in the blade width direction, the overall thickness in the suction-side surface layer area 12 be smaller than the overall thickness in the suction-side deep layer area 16, that is, a suction-side thickness proportion between the overall thickness in the suction-side surface layer area 12 and the overall thickness in the suction-side deep layer area 16 be 1 or less. At the center part of the composite blade 10 on the blade root side in the blade width direction, the suction-side thickness proportion is more preferably 0.5 or less, still more preferably 0.33 or less. In this case, in the composite blade 10, the accuracy of the profile and the thickness can be sufficiently secured more reliably and the manufacturing cost can be reduced for the suction-side blade part.

In the composite blade 10, the pressure-side blade part is divided into two regions, that is, the pressure-side surface layer area 14 and the pressure-side deep layer area 18. Composite layers each having a relatively small thickness are laid up in the pressure-side surface layer area 14, and composite layers each having a relatively large thickness are laid up in the pressure-side deep layer area 18. It is preferred that, at a center part of the composite blade 10 on the blade root side in the blade width direction, the overall thickness in the pressure-side surface layer area 14 be smaller than the overall thickness in the pressure-side deep layer area 18, that is, a pressure-side thickness proportion between the overall thickness in the pressure-side surface layer area 14 and the overall thickness in the pressure-side deep layer area 18 be 1 or less. At the center part of the composite blade 10 on the blade root side in the blade width direction, the pressure-side thickness proportion is more preferably 0.5 or less, still more preferably 0.33 or less. In this case, in the composite blade 10, the accuracy of the profile and the thickness can be sufficiently secured more reliably and the manufacturing cost can be reduced for the pressure-side blade part.

In the composite blade 10, the suction-side blade part is divided into two regions, that is, the suction-side surface layer area 12 and the suction-side deep layer area 16, but without being limited thereto, may be divided into three or more regions. When the suction-side blade part in the composite blade 10 is divided into three or more regions, composite layers each having a relatively small thickness are laid up from the suction-side surface to a shallow layer in the blade thickness direction, and composite layers each having a relatively larger thickness are laid up from the suction-side surface to a deeper layer in the blade thickness direction. In this case, in the composite blade 10, the securement of the accuracy of the profile and the thickness and the reduction in manufacturing cost can be adjusted finely for the suction-side blade part.

In the composite blade 10, the pressure-side blade part is divided into two regions, that is, the pressure-side surface layer area 14 and the pressure-side deep layer area 18, but without being limited thereto, may be divided into three or more regions. When the pressure-side blade part in the composite blade 10 is divided into three or more regions, composite layers each having a relatively small thickness are laid up from the pressure-side surface to a shallow layer in the blade thickness direction, and composite layers each having a relatively larger thickness are laid up from the pressure-side surface to a deeper layer in the blade thickness direction. In this case, in the composite blade 10, the securement of the accuracy of the profile and the thickness and the reduction in manufacturing cost can be adjusted finely for the pressure-side blade part.

Figure 6:
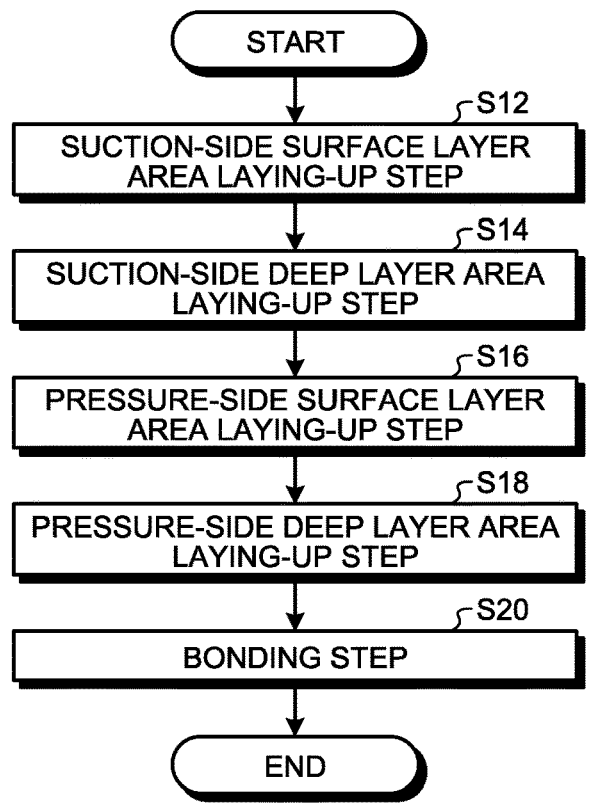
FIG. 6 is a flowchart illustrating a method for manufacturing a composite blade according to the first embodiment.
Figure 7:
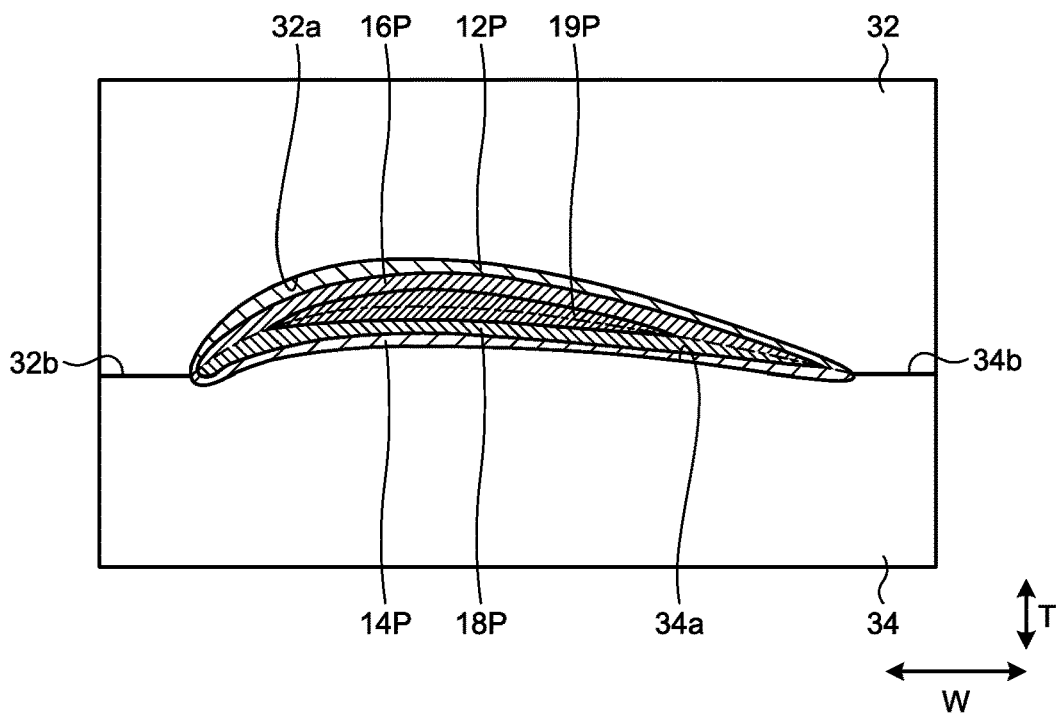
FIG. 7 is an explanatory diagram for describing a state in the middle of a flow in the method for manufacturing a composite blade according to the first embodiment.

FIG. 6 is a flowchart illustrating a method for manufacturing the composite blade 10 according to the first embodiment. FIG. 7 is an explanatory diagram for describing the state in the middle of the flow in the method for manufacturing the composite blade 10 according to the first embodiment. FIG. 7 is a cross-sectional view similarly to FIG. 2 and FIG. 3. Referring to FIG. 6 and FIG. 7, the method for manufacturing the composite blade 10 according to the first embodiment is described. The method for manufacturing the composite blade 10 according to the first embodiment is an example of a method for obtaining the composite blade 10 according to the first embodiment. As illustrated in FIG. 6, the method for manufacturing the composite blade 10 includes a suction-side surface layer area laying-up step (Step S12), a suction-side deep layer area laying-up step (Step S14), pressure-side surface layer area laying-up step (Step S16), a pressure-side deep layer area laying-up step (Step S18), and a bonding step (Step S20).

First, a suction-side mold 32 having a suction-side forming surface 32*a* for forming the suction-side surface of the composite blade 10 and a flat suction-side mold-set surface 32*b* provided around the suction-side forming surface 32*a* is prepared. The suction-side mold 32 is placed such that the suction-side forming surface 32*a* faces upward in the vertical direction. Composite layers constituting a suction-side surface layer area 12 are laid up on the suction-side forming surface 32*a* of the suction-side mold 32 (Step S12).

Next, composite layers constituting a suction-side deep layer area 16 are laid up on the composite layers constituting the suction-side surface layer area 12 laid up on the suction-side mold 32 (Step S14). After that, foamed material constituting a suction-side part of an internal region 19 is laid up on the composite layers constituting the suction-side deep layer area 16 laid up on the suction-side mold 32 to form a neutral surface.

A pressure-side mold 34 having a pressure-side forming surface 34*a* for forming the pressure-side surface of the composite blade 10 and a flat pressure-side mold-set surface 34*b* provided around the pressure-side forming surface 34*a* is prepared. The pressure-side mold 34 is placed such that the pressure-side forming surface 34*a* faces upward in the vertical direction. Composite layers constituting a pressure-side surface layer area 14 are laid up on the pressure-side forming surface 34*a* of the pressure-side mold 34 (Step S16).

Next, composite layers constituting a pressure-side deep layer area 18 are laid up on the composite layers constituting the pressure-side surface layer area 14 laid up on the pressure-side mold 34 (Step S18). After that, foamed material constituting a pressure-side part of the internal region 19 is laid up on the composite layers constituting the pressure-side deep layer area 18 laid up on the pressure-side mold 34 to form a neutral surface.

The order from Step S12 to Step S18 can be replaced as appropriate as long as Step S14 is performed after Step S12 and Step S18 is performed after Step S16. For example, the steps may be performed in the order of Step S12, Step S16, Step S14, and Step S18 or in the order of Step S16, Step S18, Step S12, and Step S14.

In the composite layers laid up at Step S12 to Step S18, thermosetting resin is in the softened state or the semi-cured state. It is preferred that these composite layers be prepreg in which the thermosetting resin is in the semi-cured state.

At Step S12 and Step S16 in the method for manufacturing the composite blade 10 according to the first embodiment, it is preferred that the composite layers 12s and the composite layers 14s be laid up such that, at the end part in the blade width direction, end parts of the composite layers 12s in the suction-side surface layer area 12 and end parts of the composite layers 14s in the pressure-side surface layer area 14 are provided in contact with neutral surface-side surfaces of composite layers in the other surface layer area. Specifically, at Step S12 and Step S16 in the method for manufacturing the composite blade 10 according to the first embodiment, it is preferred that the composite layers 12s and the composite layers 14s be laid up such that, at the end part in the blade width direction, a contact part 21 where the end part of the composite layer 12s is in contact with the surface of the composite layer 14s and a contact part 22 where the end part of the composite layer 14s is in contact with the surface of the composite layer 12s are alternatingly arranged.

After Step S12 to Step S18 are all performed, as illustrated in FIG. 7, the composite layers constituting the suction-side surface layer area 12 and the suction-side deep layer area 16 laid up on the suction-side mold 32 and the foamed material constituting the suction-side part of the internal region 19 laid up on the suction-side mold 32 are coupled, at a neutral surface, with the composite layers constituting the pressure-side surface layer area 14 and the pressure-side deep layer area 18 laid up on the pressure-side mold 34 and the foamed material constituting the pressure-side part of the internal region 19 laid up on the pressure-side mold 34. In this manner, as illustrated in FIG. 7, the composite layers constituting the suction-side surface layer area 12 and the suction-side deep layer area 16 become a pre-suction-side surface layer area 12P and a pre-suction-side deep layer area 16P, respectively. The composite layers constituting the pressure-side surface layer area 14 and the pressure-side deep layer area 18 become a pre-pressure-side surface layer area 14P and a pre-pressure-side deep layer area 18P, respectively. The foamed material constituting the internal region 19 becomes a pre-internal region 19P.

When coupled at the neutral surface, the suction-side mold-set surface 32b of the suction-side mold 32 and the pressure-side mold-set surface 34b of the pressure-side mold 34 are coupled each other so that the accuracy of the profile and the thickness of the composite blade 10 can be reliably secured.

After coupled at the neutral surface, the coupled composite layers are heated to cure thermosetting resin included in the composite layers from the softened state or the semi-cured state to the semi-cured state or the cured state, thereby bonding the composite layers (Step S20). As a result, the pre-suction-side surface layer area 12P, the pre-pressure-side surface layer area 14P, the pre-suction-side deep layer area 16P, and the pre-pressure-side deep layer area 18P become the suction-side surface layer area 12, the pressure-side surface layer area 14, the suction-side deep layer area 16, and the pressure-side deep layer area 18 in which composite materials are bonded, respectively. The pre-internal region 19P becomes the internal region 19. In this manner, the composite blade 10 is obtained.

The composite blade 10 and the method for manufacturing the composite blade 10 have the configuration as described above, and hence relatively thin composite layers are used in the surface layer areas and relatively thick composite layers are used in the deep layer areas. Consequently, in the composite blade 10 and the method for manufacturing the composite blade 10, the accuracy of profile can be sufficiently secured by the relatively thin composite layers, and the manufacturing cost can be reduced by the relatively thick composite layers, and as a whole, the accuracy of thickness can be sufficiently secured.

In the composite blade 10 and the method for manufacturing the composite blade 10, in the plane direction including the blade width direction and the blade length direction, the area of the composite layers in the surface layer areas is larger than that of the composite layers in the deep layer areas. Consequently, in the composite blade 10 and the method for manufacturing the composite blade 10, in the surface layer area in which the relatively thin composite layers are used, the accuracy of profile in a wider range in the plane direction including the blade width direction and the blade length direction can be secured.

The composite blade 10 and the method for manufacturing the composite blade 10 further have the thin part 10a that is thinner than the thick part 10b and is devoid of the deep layer area. Consequently, in the composite blade 10 and the method for manufacturing the composite blade 10, in the surface layer area in which the relatively thin composite layers are used, the accuracy of thickness in a part where the thickness in the blade thickness direction is small can be secured.

The composite blade 10 and the method for manufacturing the composite blade 10 have a blade part on the suction side and a blade part on the pressure side. The blade part on the suction side and the blade part on the pressure side are bonded at a neutral surface. The blade part on the suction side includes the suction-side surface layer area 12 and the suction-side deep layer area 16, and the blade part on the pressure side includes the pressure-side surface layer area 14 and the pressure-side deep layer area 18. Consequently, in the composite blade 10 and the method for manufacturing the composite blade 10, on the suction side and the pressure side, the accuracy of profile can be sufficiently secured by the relatively thin composite layers, and the manufacturing cost can be reduced by the relatively thick composite layers, and as a whole, the accuracy of thickness can be sufficiently secured.

Furthermore, in the composite blade 10 and the method for manufacturing the composite blade 10, an end part in the blade width direction is composed of the suction-side surface layer area 12 and the pressure-side surface layer area 14, and end parts of the composite layers 12s in the suction-side surface layer area 12 and end parts of the composite layers 14s in the pressure-side surface layer area 14 are alternatingly provided in contact with neutral surface-side surfaces of composite layers in the other surface layer area. Thus, in the composite blade 10 and the method for manufacturing the composite blade 10, as compared with the case where the end part of the composite layer 12s and the end part of the composite layer 14s are in contact with each other, ply-drops, which are gaps formed near the neutral surface when the composite layers are laid up, can be divided and made small by the end part of the composite layer. In this manner, in the composite blade 10 and the method for manufacturing the composite blade 10, the strength and the reliability at the end part in the blade width direction can be improved. Thus, the composite blade 10 and the method for manufacturing the composite blade 10 can stabilize the shape of the composite blade 10 and thus sufficiently secure the accuracy of the profile and the thickness. In the composite blade 10 and the method for manufacturing the composite blade 10, the composite layers do not need to be coupled symmetrically about the neutral surface in the blade thickness direction, and hence the manufacturing cost can be reduced.

Second Embodiment

In the composite blade disclosed in Patent Literature 1, a massive amount of thin composite layers are coupled symmetrically about a neutral surface in the blade thickness direction. Thus, the composite blade disclosed in Patent Literature 1 has a problem in that ply-drops, which are gaps formed near a neutral surface when composite layers are laid up, are greatly formed at the neutral surface. The composite blade disclosed in Patent Literature 1 has a problem in that the strength and the reliability at the end part in the blade width direction are decreased by the greatly formed ply-drops. A composite blade according to a second embodiment has been conceived in view of these problems, and it is an object thereof to provide a composite blade and a method for manufacturing a composite blade in which strength and reliability at an end part in a blade width direction are improved.

The composite blade according to the second embodiment is different from the composite blade 10 according to the first embodiment in that the tendency of the thickness of each composite layer constituting the composite blade as illustrated in FIG. 5 is not set. Specifically, the composite blade according to the second embodiment is different from the composite blade 10 according to the first embodiment in that a median value or an average value of thicknesses of each composite layer in the surface layer area does not tend to be smaller than a median value or an average value of thicknesses of each composite layer in the deep layer area. The composite blade according to the second embodiment is similar to the composite blade 10 in the other configurations. In the description in the second embodiment, the same configurations as in the first embodiment are denoted by the same reference symbol group as in the first embodiment, and detailed descriptions thereof are omitted.

Similarly to the composite blade 10, the composite blade according to the second embodiment is formed by laying up composite layers in which reinforced fibers are impregnated with resin in the blade thickness direction. The reinforced fibers and the resin constituting the composite layers included in the composite blade according to the second embodiment are similar to the reinforced fibers and the resin constituting the composite layers included in the composite blade 10.

Similarly to the composite blade 10, as illustrated in FIG. 2 and FIG. 3, the composite blade according to the second embodiment has a suction-side surface layer area 12, a pressure-side surface layer area 14, a suction-side deep layer area 16, a pressure-side deep layer area 18, and an internal region 19. The suction-side surface layer area 12 is a region from the surface on the suction side to a predetermined depth in the blade thickness direction. The suction-side deep layer area 16 is a region at a depth larger than the predetermined depth from the surface on the suction side in the blade thickness direction. The pressure-side surface layer area 14 is a region from the surface on the pressure side to a predetermined depth in the blade thickness direction. The pressure-side deep layer area 18 is a region at a depth larger than the predetermined depth from the surface on the pressure side in the blade thickness direction.

Similarly to the composite blade 10, the suction-side surface layer area 12 and the pressure-side surface layer area 14 in the composite blade according to the second embodiment are included in a surface layer area from the surface to a predetermined depth in the blade thickness direction. Similarly to the composite blade 10, the suction-side deep layer area 16 and the pressure-side deep layer area 18 in the composite blade according to the second embodiment are included in a deep layer area at a depth larger than the predetermined depth from the surface in the blade thickness direction.

Similarly to the composite blade 10, the composite blade according to the second embodiment has a thin part 10a and a thick part 10b as illustrated in FIG. 2 and FIG. 3. The thin part 10a has surface layer areas, that is, a suction-side surface layer area 12 and a pressure-side surface layer area 14. The thin part 10a does not include deep layer areas, that is, a suction-side deep layer area 16 and a pressure-side deep layer area 18. The thick part 10b has the suction-side surface layer area 12, the pressure-side surface layer area 14, the suction-side deep layer area 16, the pressure-side deep layer area 18, and an internal region 19.

Similarly to the composite blade 10, the composite blade according to the second embodiment has a suction-side blade part and a pressure-side blade part. The suction-side blade part is a region located on the suction side with respect to the middle in the blade thickness direction, and includes the suction-side surface layer area 12 and the suction-side deep layer area 16. The pressure-side blade part is a region located on the pressure side with respect to the middle in the blade thickness direction, and includes the pressure-side surface layer area 14 and the pressure-side deep layer area 18. Similarly to the composite blade 10, in the composite blade according to the second embodiment, the suction-side blade part and the pressure-side blade part are bonded at a neutral surface. Specifically, similarly to the composite blade 10, in the composite blade according to the second embodiment, the suction-side deep layer area 16 at the suction-side blade part and the pressure-side deep layer area 18 at the pressure-side blade part are bonded at the neutral surface.

Similarly to the composite blade 10, in the composite blade according to the second embodiment, in a plane direction including the blade width direction and the blade length direction, the area of the suction-side surface layer area 12 and the pressure-side surface layer area 14 as surface layer areas is larger than that of the suction-side deep layer area 16 and the pressure-side deep layer area 18 as deep layer areas. Specifically, similarly to the composite blade 10, in the composite blade according to the second embodiment, in the plane direction including the blade width direction and the blade length direction, the area of composite layers in the suction-side surface layer area 12 and the pressure-side surface layer area 14 as surface layer areas is larger than that of composite layers in the suction-side deep layer area 16 and the pressure-side deep layer area 18 as deep layer areas.

Similarly to the composite blade 10, as illustrated in FIG. 4, an end part of the composite blade according to the second embodiment in the blade width direction is composed of the suction-side surface layer area 12 and the pressure-side surface layer area 14 as surface layer areas. At the end part of the composite blade 10 in the blade width direction, end parts of a plurality of composite layers 12s in the suction-side surface layer area 12 and end parts of a plurality of composite layers 14s in the pressure-side surface layer area 14 are alternatingly provided in contact with neutral surface-side surfaces of composite layers in the other surface layer area. Specifically, in the composite blade according to the second embodiment, similarly to the composite blade 10, at the end part in the blade width direction, a contact part 21 where an end part of the composite layer 12s is in contact with the surface of the composite layer 14s and a contact part 22 where an end part of the composite layer 14s is in contact with the surface of the composite layer 12s are alternatingly arranged.

In the composite blade according to the second embodiment, similarly to the composite blade 10, the contact parts 21 and the contact parts 22 are alternatingly arranged at the end part in the blade width direction. Thus, as compared with the case where an end part of a composite layer 12s and an end part of a composite layer 14s are in contact with each other, ply-drops, which are gaps formed when the composite layers are laid up, can be divided and made small by the end parts of the composite layers. Consequently, in the composite blade according to the second embodiment, similarly to the composite blade 10, the strength and reliability are improved at the end part in the blade width direction. Thus, in the composite blade according to the second embodiment, similarly to the composite blade 10, the shape is stabilized, and hence the accuracy of the profile and the thickness can be sufficiently secured. In the composite blade 10, the composite layers do not need to be coupled symmetrically about the neutral surface in the blade thickness direction, and hence the manufacturing cost can be reduced.

A method for manufacturing the composite blade according to the second embodiment is an example of a method for obtaining the composite blade according to the second embodiment. The method for manufacturing the composite blade according to the second embodiment includes, similarly to the method for manufacturing the composite blade 10 according to the first embodiment, as illustrated in FIG. 6, a suction-side surface layer area laying-up step (Step S12), a suction-side deep layer area laying-up step (Step S14), a pressure-side surface layer area laying-up step (Step S16), a pressure-side deep layer area laying-up step (Step S18), and a bonding step (Step S20).

At Step S12 and Step S16 in the method for manufacturing the composite blade according to the second embodiment, similarly to the first embodiment, the composite layers 12s and the composite layers 14s are laid up such that, at the end part in the blade width direction, end parts of the composite layers 12s in the suction-side surface layer area 12 and end parts of the composite layers 14s in the pressure-side surface layer area 14 are alternatingly provided in contact with neutral surface-side surfaces of composite layers in the other surface layer area. Specifically, similarly to the first embodiment, at Step S12 and Step S16 in the method for manufacturing the composite blade according to the second embodiment, the composite layers 12s and the composite layers 14s are laid up such that, at the end part in the blade width direction, a contact part 21 where an end part of the composite layer 12s is in contact with the surface of the composite layer 14s and a contact part 22 where an end part of the composite layer 14s is in contact with the surface of the composite layer 12s are alternatingly arranged. In this manner, the method for manufacturing the composite blade according to the second embodiment can obtain the composite blade according to the second embodiment.

The composite blade according to the second embodiment and the method for manufacturing the composite blade according to the second embodiment have the configuration as described above, and hence ply-drops, which are gaps formed when the composite layers are laid up, can be divided and made small by the end parts of the composite layers. Consequently, in the composite blade according to the second embodiment and the method for manufacturing the composite blade according to the second embodiment, the strength and reliability are improved at the end part in the blade width direction. Thus, in the composite blade according to the second embodiment and the method for manufacturing the composite blade according to the second embodiment, the shape is stabilized, and hence the accuracy of the profile and the thickness can be sufficiently secured. In the composite blade according to the second embodiment and the method for manufacturing the composite blade according to the second embodiment, the composite layers do not need to be coupled symmetrically about the neutral surface in the blade thickness direction, and hence the manufacturing cost can be reduced.

In the composite blade according to the second embodiment and the method for manufacturing the composite blade according to the second embodiment, similarly to the composite blade 10 and the method for manufacturing the composite blade 10, in the plane direction including the blade width direction and the blade length direction, the area of composite layers in the surface layer areas is larger than that of composite layers in the deep layer area. Consequently, in the composite blade according to the second embodiment and the method for manufacturing the composite blade according to the second embodiment, the strength and the reliability are more improved at the end parts of the composite layers at which the end parts in the blade width direction are provided alternatingly in contact with each other. Thus, in the composite blade according to the second embodiment and the method for manufacturing the composite blade according to the second embodiment, the shape is stabilized in a wider range in the plane direction including the blade width direction and the blade length direction, and hence the accuracy of profile in a wider range in the plane direction including the blade width direction and the blade length direction can be secured.

Similarly to the composite blade 10 and the method for manufacturing the composite blade 10, the composite blade according to the second embodiment and the method for manufacturing the composite blade according to the second embodiment further have the thin part 10a that is thinner than the thick part 10b and is devoid of the deep layer areas. Thus, in the composite blade according to the second embodiment and the method for manufacturing the composite blade according to the second embodiment, at the end parts of the composite layers at which the end parts in the blade width direction are provided alternatingly in contact with each other, the strength and the reliability are more improved at a part where the thickness in the blade thickness direction is small. Consequently, in the composite blade according to the second embodiment and the method for manufacturing the composite blade according to the second embodiment, the shape is stabilized at a part where the thickness in the blade thickness direction is small, and hence the accuracy of thickness at a part where the thickness in the blade thickness direction is small can be secured.

REFERENCE SIGNS LIST

10 Composite blade
10a Thin part
10b Thick part
12 Suction-side surface layer area
12P Pre-suction-side surface layer area
12s, 14s Composite layer
14 Pressure-side surface layer area
14P Pre-pressure-side surface layer area
16 Suction-side deep layer area
16P Pre-suction-side deep layer area
18 pressure-side deep layer area 18P Pre-pressure-side deep layer area
19 Internal region
19P Pre-internal region
21, 22 Contact part
32 Suction-side mold
32a Suction-side forming surface
32b Suction-side mold-set surface
34 Pressure-side mold
34a Pressure-side forming surface
34b Pressure-side mold-set surface
D1, D2, D3, S1, S2, S3 Range

The invention claimed is:

1. A composite blade formed by laying up composite layers in which reinforced fibers are impregnated with a resin, wherein
the composite layers are laid up in a blade thickness direction that is a direction connecting a suction side and a pressure side of the composite blade to separately form a blade part on the suction side and a blade part on the pressure side, an end part of each composite layer being dropped off on a lower composite layer adjacent to the composite layer,
the composite blade includes a thick part that has a surface layer area from a surface of the thick part to a predetermined depth in the blade thickness direction and a deep layer area at a depth larger than the predetermined depth from the surface in the blade thickness direction,
a median value in a predetermined range of thicknesses of each composite layer in the surface layer area is smaller than a median value in a predetermined range of thicknesses of each composite layer in the deep layer area,
the blade part on the suction side and the blade part on the pressure side are bonded at a neutral surface,
the blade part on the suction side has, in the blade thickness direction, a suction-side surface layer area from a surface on the suction side to the predetermined depth and a suction-side deep layer area at a depth larger than the predetermined depth from the surface on the suction side in the blade thickness direction,
the blade part on the pressure side has, in the blade thickness direction, a pressure-side surface layer area from a surface on the pressure side to the predetermined depth and a pressure-side deep layer area at a depth larger than the predetermined depth from the surface on the pressure side in the blade thickness direction,
an end part of the composite blade in a blade width direction that is a direction connecting a leading edge side and a trailing edge side of the composite blade is composed of the suction-side surface layer area and the pressure-side surface layer area,
the dropped-off end parts of the composite layers in the blade width direction in the suction-side surface layer area and the dropped-off end parts of the composite layers in the blade width direction in the pressure-side surface layer area are provided such that, in an alternating manner, the dropped-off end parts of the composite layers in the suction-side surface layer area are in contact with neutral surface-side surfaces of the composite layers in the pressure-side surface layer area, and the dropped-off end parts of the composite layers in the pressure-side surface layer area are in contact with neutral surface-side surfaces of the composite layers in the suction-side surface layer area, so that the dropped-off end part of one composite layer, the neutral surface-side surface of the composite layer in contact with the one composite layer, and the lower composite layer adjacent to the one composite layer define a ply drop gap.

2. The composite blade according to claim 1, wherein, in a plane direction including the blade width direction and a blade length direction that is a direction connecting a blade tip side and a blade root side of the composite blade, an area of the composite layers in the surface layer area is larger than an area of the composite layers in the deep layer area.

3. The composite blade according to claim 1, further comprising a thin part that is thinner than the thick part and is devoid of the deep layer area.

* * * * *